Patented Apr. 18, 1950

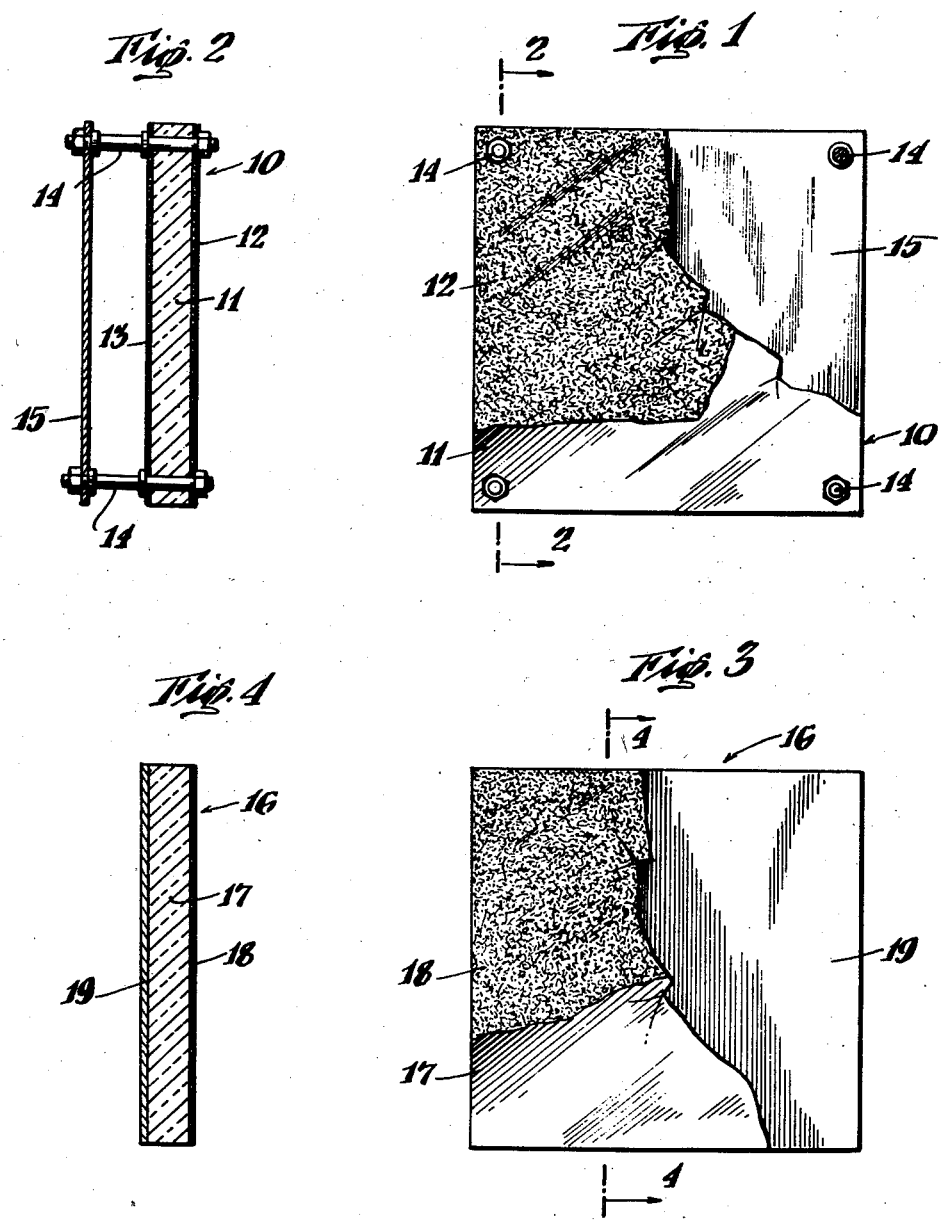

2,504,299

UNITED STATES PATENT OFFICE 2,504,299

REVERSIBLE HUMIDITY INDICATOR

Leonard C. Cartwright, New York, N. Y., assignor to Foster D. Snell, Inc., a corporation of New York Application September 17, 1947, Serial No. 774,450

8 Claims. (Cl. 73—335)

This invention relates to an indicator for humidity and particularly to a reversible indicator.

The need of indicators to show whether a safe level of humidity is exceeded is well recognized. It has been a problem of long standing in connection with shipping or use of certain cameras, electrical instruments, and physical measuring devices.

In some instances, the equipment is protected in closed cases. In such instances, it is sufficient to include, within the sealed case, a non-reversible indicator showing at any time whether a certain level of humidity has or has not been reached.

In other instances, as in those assemblies in which the instrument to be protected is subject to some circulation of air, it is important that the indicator for humidity be reversible, so that the humidity condition at any particular time may be noted by visual examination of the indicator.

This invention meets this demand in providing a visible reversible indicator of the level of humidity. It provides an indicator that is simple in construction, positive in action, and based upon the conversion of an opaque object to one that is transparent when the humidity reaches a certain level and is maintained at that level for a reasonable period of time.

Briefly stated, the invention comprises the herein described humidity indicating device including the combination of a sheet or like screen member of transparent material, a roughened surface of this member which serves to make the member opaque, and a deliquescent material applied over the roughened surface and serving, on deliquescing, to smooth the roughened surface by forming thereover an aqueous solution.

In the preferred embodiment, the device of the invention includes also a background member of characteristic appearance disposed behind the screen, the deliquescing referred to making the previously obscured background visible to the observer.

In a modification, a surface active agent is distributed throughout the deliquescent material to increase the smoothing effect on exposure of the deliquescent material to the critical humidity level.

The invention will be illustrated by description in connection with the attached drawing to which reference is made.

Fig. 1 is a plan view of the device of my invention.

Fig. 2 is a sectional view on line 2—2 of Fig. 1.

Fig. 3 is a plan view of a modification of the invention.

Fig. 4 is a sectional view on line 4—4 of Fig. 3.

In Figs. 1 and 3 the views of the assemblies are partly broken away for clearness of illustration.

There are shown the humidity indicator including a screen member indicated generally at 10 having a body portion 11 of transparent material, a roughened face 12, and a roughened back 13.

The background member 15 is maintained in spaced relationship to the transparent material screen by means of spacer bolt assemblies 14.

In the modification shown in Figs. 3 and 4, the sheet of transparent material indicated generally at 16 has a transparent body portion 17 and roughened face 18. The back of the sheet, which is not roughened, is mounted directly upon background member 19 as by any suitable transparent adhesive (not shown).

The background members 15 and 19 may be of any suitable material of characteristic appearance. They may be colored glass, enameled steel, colored paper, newspaper or other printed paper, the printing on the paper or the colors of the other background members providing characteristic appearance or features for which the observer looks in using the indicator. As an example, the background member may have printed thereon a warning, such as "Do not use" or the like, which will become visible and legible through the screen member when the latter is rendered transparent by exposure to humidity higher than a predetermined critical level.

The screens 11 or 17 are preferably sheets such as window glass, glass microscope slides, Celluloid, cellulose acetate plastic, or transparent cellulose sheeting known as cellophane.

In any case, the screen 11 or 17 has a roughened surface such as both face and back in the structure of Figs. 1 and 2 or face only in the structure of Figs. 3 and 4. When both face and back of the screen are roughened, then the back is spaced from the background member sufficiently to permit circulation over the back of air the humidity of which is to be tested. A suitable spacing is 1 to 5 mm.

The roughened surface or surfaces of the sheets may be provided by sand blasting, grinding with a conventional grinding powder, or, in the case of glass, the etching method such as used to produce frosted electric light bulbs. Using 180-mesh carborundum grinding powder, for instance, I have given to conventional microscope slides an average whiteness value, as measured by a standard reflectometer, of about 69. Preferably, both face and back are roughened. This increases the whiteness by the reflectometer test and the obscuring power of the dry screen in actual use.

As the deliquent material applied over the roughened surface or surfaces of the transparent object, such as the sheets 11 and 17 of the drawings, I select a water soluble material such as a salt the saturated solution of which in water has a water vapor pressure either approximately equal to or somewhat less than the water vapor pressure in air of the humidity to be indicated by the testing device.

Lithium chloride is preferred as the deliquescent material for detecting relatively low humidities. At 25° C. in an atmosphere with a water vapor pressure of 2.8 mm. of mercury or over, it will absorb moisture to give an aqueous solution which makes transparent what was previously a roughened surface of the sheet material, so as to cause the background member to be visible through the sheet. Thus, lithium chloride at 25° C. may be used to detect any relative humidity above about 12%.

Zinc chloride is preferred as the deliquescent material for detecting very low humidities. At 25° C. in an atmosphere with a water vapor pressure of 0.3 mm. of mercury or over, it will absorb moisture to give an aqueous solution which makes transparent the roughened sheet material and renders the background member visible through the sheet. Thus, zinc chloride may be used to detect any relative humidity above about 2% at 25° C.

Potassium acetate is preferred as the deliquescent material for detecting humidities above about 20% at 25° C., and potassium carbonate for detecting humidities above about 45% at 25° C.

Other materials that illustrate the useful class of the deliquescent materials and that may be used are lithium bromide, lithium iodide, calcium chloride, and ammonium nitrate. These representative salts are soluble in water, absorb moisture from humid air, and continue to absorb moisture until a solution of the deliquescent material is eventually formed.

The selected deliquescent material may be applied in any convenient manner to the roughened surface such as 12, 13 or 18 of Figs. 2 and 4. Thus the deliquescent material may be first dissolved in water and then applied to the screen, such as the ground surface of a glass plate, by conventional brushing, spraying or dipping technic.

To improve the smoothing and attendant transparentizing effect of the deliquesced material over the normally opaque surface of the screen there is incorporated to advantage a surface-active agent that has the property of lowering the interfacial tension of water against the material of which the screen is composed. Examples of such agents that may be used are sodium lauryl sulfate, sodium keryl benzene sulfonate, sodium dialkyl succinyl sulfate, or the corresponding potassium salts. Other such agents that may be used are N-phenyl methyl taurine and a fatty acid- or fatty alcohol-polyethylene oxide condensation product.

The humidity warning device of the present invention works particularly well when the thickness of the layer of applied deliquescent material is such that its saturated aqueous solution will have a thickness of 8 to 30 microns and preferably 12 to 24 microns.

When the thickness of the applied layer is outside the above ranges by a substantial amount, difficulty is encountered. When the thickness of the applied layer is much thinner than the lower limits stated, there is incomplete covering of the surface by the solution formed on deliquescence. When, on the other hand, the thickness of the applied layer is substantially above the maximum shown, an objectionably long time is required for the indicator to respond to the level of humidity to which the deliquescent material is sensitive.

A layer of suitable thickness results, for instance, on dipping a glass plate in a fairly concentrated solution of the deliquescent material.

I apply preferably a solution of the deliquescent material of concentration 15% to 30% in aqueous solution. I dip the sheet with roughened surface into such solution, allow the sheet to drain briefly, and then dry it. With a 15% solution of lithium chloride as the solution, for example, I obtain a coating on a ground glass plate which causes the background to show through in 2.5 hours when the deliquescent material is exposed to a relative humidity of 20% at 25° C. It is restored to its dry (opaque) condition in 20 hours at 0% relative humidity. It is not affected by repeated use and is considered to have an indefinite life of usefulness. Using a 25% solution for the dipping, 9 hours was required for showing through of the background under similar conditions of exposure.

When both sides of the screen are made rough, as in the sheet 10 in Figs. 1 and 2, then a space is left between the back 13 of the plate and the background 15. This space ensures contact of the back as well as the face of the sheet with moisture in the air to be tested, so that the deliquescent material on the back dissolves and makes the back transparent after the usual testing period, in accordance with the behavior of the deliquescent material on the face of the sheet.

In selecting the deliquescent material to use, consideration is given to the water vapor pressure of the saturated solution of the various deliquescent materials available for use as compared to the humidity level which is to be indicated. Such consideration for any salt will show whether the salt will be useful in warning of any particular humidity expected to be encountered. For the absorption of moisture from the air, the water vapor pressure of the solution of the salt which is to deliquesce must be lower than the water vapor pressure in air at the said humidity.

Examples of salts that may be used are given below in the order of increasing water vapor pressures of their saturated aqueous solutions, the data being mostly from international critical tables.

| Deliquescent Material | Water Vapor Pressure of Saturated Solution at 25° C., mm. of mercury |
| --- | --- |
| Zinc chloride | 0.27 |
| Lithium bromide | 1.5 |
| Lithium iodide | 2.0 |
| Lithium chloride | 2.77 |
| Potassium acetate | 4.6 |
| Calcium chloride | 6.97 |
| Potassium carbonate | 10.15 |
| Ammonium nitrate | 14.7 |

When the selected deliquescent material has been applied to the roughened and therefore opaque surface of the screen 11 or 17 and the assembly of the screen with the background is exposed to moisture-containing gas, the assembly indicates changes that occur in the humidity conditions. Above the level of humidity for which the particular deliquescent material has been chosen, the material deliquesces and makes transparent the roughened surface of the sheet. When the humidity falls below the critical level, the deliquescent material dries and restores the assembly to condition for reuse in further warning of increase in humidity.

The invention will be further illustrated by description in connection with the following specific examples of the practice of it.

Example 1

A glass microscope slide is ground with 180 mesh Carborundum grinding powder until the face of the slide is roughened and the slide made opaque, that is, when viewed at a right angle to its face. This glass is then dipped in a solution of 15 parts of lithium chloride in 85 parts of water and drained, the solution which adheres to the back of the slide being removed by a towel and the solution on the face of the slide being dried in a drying oven. The weight of lithium chloride retained is about 1 mg. to the sq. cm.

This glass is then applied face up as a screen over a piece of solid red paper of the same length and width as the microscope-slide. The assembly is then placed in the case of an analytical chemical balance. When the humidity in the case rises above the critical level for the lithium chloride, as shown above, the lithium chloride deliquesces and forms a solution. This solution causes the roughened face of the glass to become transparent, so that the colored paper background can be seen readily.

Example 2

The procedure of Example 1 is repeated except that the deliquescent material used is zinc chloride applied in the form of a 35% solution, both sides of the microscope slide are roughened by the grinding operation, and the slide with ground face and back and applied and then dried calcium chloride is maintained at a distance of 3 mm. from the background by spacing members of any convenient type disposed between the ends of the microscope slide and the background member.

When a piece of newspaper is used as the background member, reading of the print through the microscope slide coated with deliquescent material on the roughened surface of it is a test of deliquescence of the said material.

Example 3

The procedure of Example 1 or 2 is followed, except that the deliquescent material used is potassium acetate applied in the form of a 30% solution.

Example 4

The procedure of Example 1 or 2 is followed, except that the deliquescent material used is calcium chloride applied in the form of a 20% solution.

Example 5

The procedure of Example 1 or 2 is followed, except that the deliquescent material used is potassium carbonate applied in the form of a 25% solution.

Example 6

The procedure of Example 1 to 5 is followed except that a sodium higher alkyl sulfate, as a surface-active agent, is dissolved in the original solution of the deliquescent material in the proportion of 5 parts to 100 parts of the said material. After the drying operation, the surface-active agent remains distributed throughout the layer of deliquescent material.

For comparison, the appearance of an assembly of the same kind as the warning device, except that no deliquescent agent is applied to the roughened surface of the screen, may be observed side by side with the warning device. The comparison may be accomplished also by treating only a portion of the roughened surface of the screen member with the deliquescent agent, so that the untreated portion remains opaque in contrast with the treated portion, which is rendered transparent by exposure to humidity above the critical level for the particular deliquescent agent used. In this way deliquesence on the exposed warning device may be noted somewhat sooner than otherwise. Thus two halves of a window may normally have the same or nearly the same appearance, but when unduly exposed to humidity may look transparent and opaque, respectively, as a warning.

It will be understood also that it is intended to cover all changes and modifications of the examples of the invention herein chosen for the purpose of illustration which do not constitute departures from the spirit and scope of the invention.

What I claim is:

1. A warning device for indicating humidity above a predetermined level which comprises a member constructed of transparent material and having a roughened surface thereby making the member opaque overall, and a material deliquescent at said predetermined level of humidity disposed as a thin layer over the roughened surface and serving, by deliquescense at the humidity level to be indicated, to form a solution over the roughened surface and thus make the said member transparent.

2. A warning device for indicating a humidity level which comprises a colored object, a member constructed of transparent material disposed as a screen over the said object and having a roughened surface thereby making the member opaque overall, and a material diiquescent at said predetermined level of humidity disposed as a thin layer over the roughened surface and serving, by deliquescence at the humidity level to be indicated, to form a solution over the roughened surface and make the said member transparent.

3. A warning device for indicating humidity above a predetermined level comprising a background member of characteristic appearance, a screening sheet of transparent material disposed in front of the background member and having a roughened surface thereby causing the sheet when dry to be opaque, and a material deliquescent at said predetermined level of humidity applied over the roughened surface, so that the said material on deliquescing forms a solution bathing the roughened surface and thus makes the sheet transparent so that the background member becomes visible through the sheet.

4. An indicator as described in claim 3, the said sheet being glass.

5. An indicator as described in claim 3, the said sheet being glass roughened on face and back and the indicator including spacing elements maintaining the said sheet in spaced relationship to the background member.

6. An indicator as described in claim 3, the deliquescent material being applied as a layer of such average thickness that its saturated aqueous solution will have a thickness of 8 to 30 microns.

7. An indicator as described in claim 3, the said sheet being roughened on its face only and the back of the sheet being in direct contact with the background member.

8. A device as described in claim 1 including a surface active agent distributed throughout the said material and promoting smoothing of the said solution over the said roughened surface.

LEONARD C. CARTWRIGHT.

REFERENCES CITED

The following references are of record in the file of this patent:

UNITED STATES PATENTS

| Number | Name | Date |
| --- | --- | --- |
| 1,424,642 | Hanlon | Aug. 1, 1922 |
| 1,933,803 | Hickman | Nov. 7, 1933 |
| 2,214,354 | Snelling | Sept. 10, 1940 |
| 2,249,867 | Snelling | July 22, 1941 |

FOREIGN PATENTS

| Number | Country | Date |
| --- | --- | --- |
| 511,876 | France | Oct. 1, 1920 |